United States Patent
Heikell

(10) Patent No.: US 9,595,008 B1
(45) Date of Patent: Mar. 14, 2017

(54) SYSTEMS, METHODS, APPARATUS FOR EVALUATING STATUS OF COMPUTING DEVICE USER

(76) Inventor: Timothy P. Heikell, Seattle, WA (US)

( * ) Notice: Subject to any disclaimer, the term of this patent is extended or adjusted under 35 U.S.C. 154(b) by 780 days.

(21) Appl. No.: 12/313,502

(22) Filed: Nov. 19, 2008

Related U.S. Application Data

(60) Provisional application No. 61/003,743, filed on Nov. 19, 2007.

(51) Int. Cl.
*G06F 9/44* (2006.01)
*G06F 7/02* (2006.01)
*G06N 7/06* (2006.01)
*G06N 7/00* (2006.01)

(52) U.S. Cl.
CPC .................... *G06N 7/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,694,244 B2* | 4/2014 | Schalk | ................... | G01C 21/26 340/995.12 |
| 8,700,259 B2* | 4/2014 | Schalk | ............... | G01C 21/3608 701/36 |
| 8,706,405 B2* | 4/2014 | Schalk | ................... | G01C 21/26 340/995.12 |
| 8,738,287 B2* | 5/2014 | Schalk | ............... | G01C 21/3608 340/995.12 |
| 8,775,235 B2* | 7/2014 | Hedley | ................... | G07B 15/06 705/13 |
| 8,775,236 B2* | 7/2014 | Hedley | ............... | G06Q 30/0283 340/928 |

(Continued)

OTHER PUBLICATIONS

A proactive risk-aware robotic sensor network for Critical Infrastructure Protection Jamieson McCausland; George Di Nardo; Rafael Falcon; Rami Abielmona; Voicu Groza; Emil Petriu 2013 IEEE International Conference on Computational Intelligence and Virtual Environments for Measurement Systems and Applications (CIVEMSA) Year: 2013 pp. 132-137.*

(Continued)

*Primary Examiner* — Michael B Holmes
(74) *Attorney, Agent, or Firm* — Lee & Hayes, PLLC; Bea Koempel-Thomas; Susan Moss

(57) ABSTRACT

Methods, systems and apparatus for assessing the likely user status of a client computing device interacting with a server where the computing device is in bi-directional operative communication with the server, wherein the likely user status is one of a human operator or a computer executable program such as a "bot". By presenting issued data from the server to the client computing device and monitoring at least some of the data generated at the client computing device in response to the issued data, a comparison can be made between the monitored data and model data relating to human interaction with or in response to the issued data. The results of the comparison can lead to a value that represents the likelihood that the monitored data results from human interaction with or in response to the issued data. Modeled data includes, but is not limited to, data indicative of human interaction with a computing environment, whether active or passive.

20 Claims, 4 Drawing Sheets

(56) References Cited

U.S. PATENT DOCUMENTS

| | | | | |
|---|---|---|---|---|
| 8,824,659 B2* | 9/2014 | Bushey | ............... | G10L 19/0204 |
| | | | | 379/265.02 |
| 8,825,379 B2* | 9/2014 | Schalk | ................... | G01C 21/26 |
| | | | | 340/995.12 |
| 8,903,052 B2* | 12/2014 | Moore | ................. | H04M 3/493 |
| | | | | 379/72 |
| 9,088,652 B2* | 7/2015 | Bushey | ............... | G10L 19/0204 |
| 9,152,381 B2* | 10/2015 | Valentino | ................ | G06F 7/588 |
| 9,208,461 B2* | 12/2015 | Busa | ....................... | G06Q 10/06 |
| 9,240,078 B2* | 1/2016 | Hedley | .................. | G07B 15/06 |
| 2008/0225870 A1* | 9/2008 | Sundstrom | .................... | 370/401 |

OTHER PUBLICATIONS

Trust Assessment from Observed Behavior: Toward and Essential Service for Trusted Network Computing P. Pal; F. Webber; M. Atighetchi; N. Combs Fifth IEEE International Symposium on Network Computing and Applications (NCA'06) Year: 2006 pp. 285-292, DOI: 10.1109/NCA.2006.53 IEEE Conference Publications.*

Testability modeling and analysis of a rocket engine test stand G. Temple; N. Jize; P. Wysocki 2005 IEEE Aerospace Conference Year: 2005 pp. 3874-3895, DOI: 10.1109/AERO.2005.1559694 IEEE Conference Publications.*

* cited by examiner

SYSTEMS, METHODS, APPARATUS FOR EVALUATING STATUS OF COMPUTING DEVICE USER

BACKGROUND

The Internet is a fantastic tool for constructive web sites to gather users for a common purpose; however, the Internet is also a fantastic tool for abuse of these same web sites. People who want to take advantage of websites do so by creating automated programs employing various algorithms and routines (hereinafter "bots") that create fictitious accounts or access content for a multitude of reasons.

In an effort to block these bots, builders of web sites have created a variety of tests to determine if the user is a bot or if the user is a human. Initial efforts required a user to simply enter an alphanumeric string into an input field. However, as character recognition engines became more available, such "tests" became easily defeated. What was needed was a more robust form of test—one that couldn't be easily defeated.

Carnegie Mellon University coined the term "CAPTCHA" (Completely Automated Public Turing test to tell Computers and Humans Apart) for these types of tests. A common type of CAPTCHA requires that the user type the letters, digits or characters of a distorted image appearing on the screen. The objective is to create an image that a bot cannot easily parse but that is discernable by a human. Such efforts have been successful in preventing non-adaptive software from recognizing the imaged characters, but people intent on abusing these sites have designed ways to circumvent the CAPTCHA, such as through specially tuned character recognition programs. A brief survey of the Internet will reveal many resources that describe how to tune and/or use character recognition to decipher CAPTCHA including aiCaptcha, Simon Fraser University and PWNtcha.

The result of the foregoing is that while CAPTCHAs are becoming increasingly more difficult for bots, they are also becoming more difficult and/or burdensome for human users. In certain instances, the desire to defeat the bots has resulted in images that are so distorted that some human users cannot decipher the images. This is particularly true with users having a visual deficiency or imparity. As a partial solution to this escalation of perception difficulty, some web sites have begun adding a link to a sound file that will speak the characters, but these sound files are also being drastically distorted to protect against being discerned by bots through speech pattern matching algorithms. Other web sites like Facebook.com, have gone so far as to adopt a practice requiring deciphering two distorted word images to increase the complexity for bots. While perhaps achieving the stated objective, the collateral effect is to exacerbate the existing burden to human users.

Current CAPTCHA technology is visual or auditory in nature, requiring the human user to answer a test that should be simple to most humans but difficult for non-humans, e.g., bots. Visual CAPTCHA using distorted images is widely used as the primary test by nearly every top Internet site including Yahoo, Google, You Tube, Microsoft's Live ID, MySpace, Facebook, Wikipedia, Craigs List. By using solely visual testing criteria, nearly all users will be able to invoke the requested action; not all users have functioning audio equipment or environments such as libraries may not permit such use.

A positive user experience is critical to the success and increased popularity of a given website. Designers of web sites go to great lengths to ensure their website is as user friendly as possible. Carnegie Mellon University estimates that 60 million CAPTCHA tests are deciphered every day and with an average time spent of 10 seconds, requiring a total of 150,000 hours of work spent every day trying to protect web sites from bots. Reducing or eliminating the requirement of a user having to decipher CAPTCHA is one more way websites can create a more positive user experience for their visitors and minimize opportunity costs.

SUMMARY OF THE INVENTION

The invention is generally directed to methods, systems and apparatus for assessing the likely user status of a computing device interacting with a server where computing device is in bi-directional operative communication with the server wherein the status is one of a human operator or a computer executable program (also referred to herein as a "bot"). This assessment comprises comparing acquired and/or available data relating to the operation of the computing device to suitable models embodying human user derived data (model data). In most embodiments, the comparison yields a probability value as to one of the status states 140, 330, which then may be used by a program or administrator of the server to permit or deny access and/or operation to the computing device. Because many of the invention embodiments provide a probability result as opposed to a binary result, the invention embodiments avoid the "there is only one right answer" phenomena inherent in prior art CAPTCHA tests. In other words, rather than placing the burden of proof on the user for functionality/access, which if the user is a human invokes the negative consequences of conventional CAPTCHA tests as previously described, the burden is shifted to the server side of the equation.

BRIEF DESCRIPTION OF THE DRAWINGS

The detailed description is described with reference to the accompanying figures. The use of the same reference numbers in different figures indicates similar or identical components or features.

DETAILED DESCRIPTION OF THE INVENTION

Figure 1:
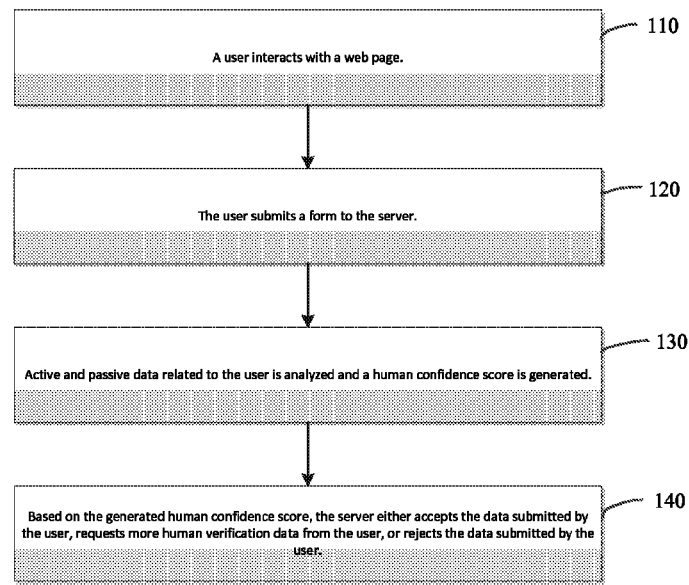
FIG. 1 illustrates an overview of the process described in this disclosure.
Figure 2:
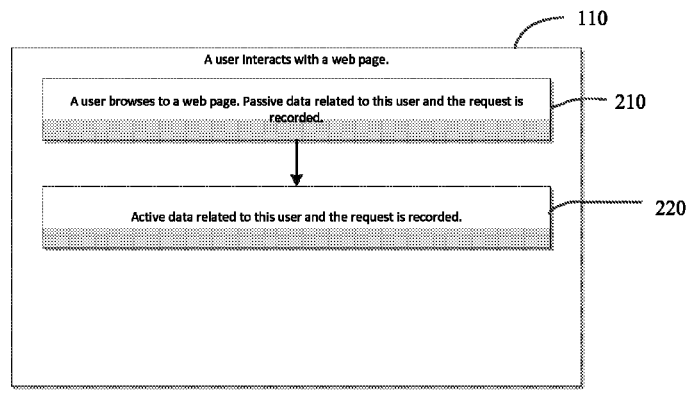
FIG. 2 illustrates in more detail the first step 110 of FIG. 1 (a user interacts with a web page).
Figure 3:
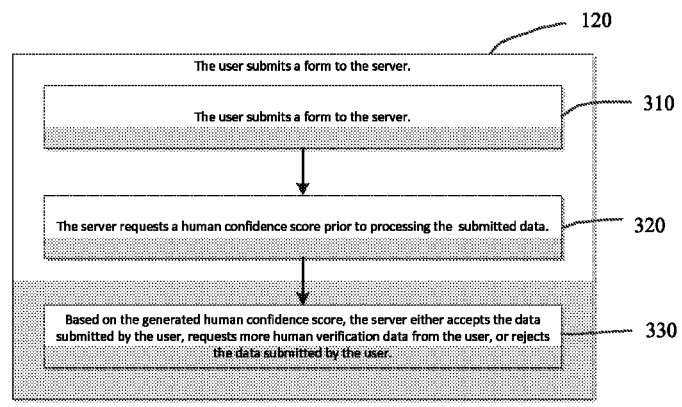
FIG. 3 illustrates in more detail the second step 120 of FIG. 1 (the user submits a form to the server).
Figure 4:
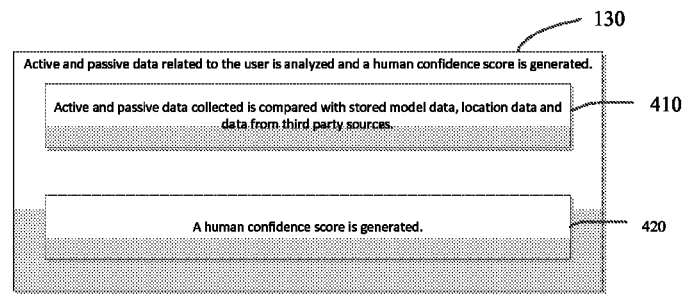
FIG. 4 illustrates in more detail the third step 130 of FIG. 1 (active and passive data related to the user is analyzed and a human confidence score is generated).

As used herein, "model data", its equivalents and verb forms comprises data indicative of human interaction with a computing environment and that can be received by a computing device that is physically remote from the sample computing environment and equivalents. Model data comprises two main categories: active model data 220 and passive model data 210. Active model data comprises data acquired from a computing device user's interactions therewith and within the computing environment where such data is not normally stored (logged) or transmitted to a remote location. Such model data includes, without limitation, pointing device vector movements and/or cadence, key stroke combinations and/or cadence, time differentials between stimulus (e.g., display of dialog box, radio button, form field, etc., and/or generation of sound) and user response (e.g., input into dialog box, selection of radio button, completion of form field, new page display request rates, etc., and/or input response to sound), and similar metrics. Generally, such data must be monitored and stored 210, 220 by a program operative on the computing device, which makes the data available to another program, preferably on a server 320, or actively transmits such data to a server. Passive model data comprises data available from a computing device user's interactions therewith and within the computing environment where such data is normally stored (logged) or transmitted to a remote location. Such model data includes, without limitation, browser cookies, destination IP histories, originating IP address, originating IP address traffic data, originating IP address physical location, third party data regarding abusers (including originating IP addresses and physical locations), etc.

Also as used herein, the term "available data", its equivalents and verb forms comprises data associated with a computing device's operation and its interaction with a computing environment, such as the Internet, that is generally recorded within the computing device and/or by other devices that have been affected by the computing device's operation—this is also a type of passive data; the term "acquired data", its equivalents and verb forms comprises data associated with a computing device's operation and its interaction with a computing environment, such as the Internet, that is generally not recorded within the computing device and/or by other devices that have been affected by the computing device's operation, but at least some data of which has/have been recorded and/or transmitted to a remote location, such as a server—this is a type of active data.

In addition to the foregoing, the term "issued data", its equivalents and verb forms comprises data generated by a server or other computing device that is not the same as the computing device for which the assessment as to user status is being performed; "monitored data", its equivalents and verb forms comprises active or passive data, whether available or acquired, obtained from the computing device, or as a result of its external interactions, after the generation of issued data; "interest data", its equivalents and verb forms comprises active or passive data, whether available or acquired, that correlates to any data within model data, whether obtained prior to or after the generation of issued data. Thus, interest data includes time independent available data and acquired data, unless qualified differently.

With the foregoing definitions in mind, operation of the various invention embodiments can be better understood. In a first series of embodiments, a comparison between interest data, acquired prior to delivery of issued data to the client computing device, and model data is performed to ascertain the likely status of the client computing device, i.e., human user or bot 130, 420. In a second series of embodiments, a comparison between monitored data, by definition acquired after delivery of issued data to the client computing device, and model data is performed to ascertain the likely status of the client computing device, i.e., human user or bot 130, 420. In both series of embodiments, acquired and/or available data may be used for comparison with suitable model data. The recited comparisons can take place locally on the computing device, remotely on the originating server, or on a server dedicated to performing such actions and for which subscriptions may be offered in conjunction with methods for providing services according to the methods, apparatus and systems embodiments described herein.

While available data represents data that is readily harvestable by query, for example, from the computing device or the computing environment in which the device operates, acquired data requires some form of information capture means. In the various embodiments described herein, the computing device is caused to monitor and retain certain data useful as acquired data for comparison purposes. Such monitoring and retaining means for acquiring data from the computing device comprises, without limitation, modification of (an) existing program(s) (e.g., such means are included in available browsers), a covert program (e.g., many malware applications log keystrokes and periodically pass them to remote servers for malicious purposes; similar technology can be used to exploit necessary aspects of the invention embodiments), or a servlet/Java applet. If user privacy is a concern, the monitoring and retaining means can remain dormant until activated by, for example, an enabled web site 110.

The monitoring and retaining means may also enable transmission of some or all retained data 410, in encrypted or unencrypted form, as may be desired for privacy and security purposes, and/or merely retain the data until requested from, for example, the server, at which time some or all data may be transmitted 120, 310. As described above with reference to the comparison actions 130, 410, such receiving and/or polling actions can be carried out remotely on the originating server or on a server dedicated to performing such actions, if not performed locally on the computing device.

From the foregoing, it can be seen that implementation of the invention embodiments can be accomplished exclusively from the server side; it is not necessary to distribute or install in the conventional sense client side software. Existing available browsers and operating systems provide the means necessary to temporarily install logging code, if such is elected. Moreover, the methods, and associated systems and apparatus, described herein are highly transparent to the user, thereby achieving an objective of enhancing the user's experience of a web site employing bot assessment protocols.

DESCRIPTION OF AN INVENTION EMBODIMENT

A primary objective of bot creation is to autonomously access data and/or functionality of a target server as quickly as possible. By assessing user biometrics having a time domain, the time variable becomes a necessary component to accessing the data and/or functionality of the server. Because such assessment has heretofore been absent as a valid CAPTCHA marker of a human user, and more importantly because proper data input would necessarily slow the process, the likelihood of bot penetration has been significantly reduced.

An embodiment of the invention employs a first layer of testing that simply checks if there were valid mouse movements and/or key strokes inputted by the user of a computing device that is attempting to access a server resource "protected" from bots. This basic "if-then" check is essentially without overhead since there are no computations being carried out. Checking for the existence of the target activity therefore represents a first pass evaluation; if the bot is not programmed to include pseudo biometric data, further access is denied. In other words, if no activity is recorded there is a very high probability that the user is actually a bot.

A fundamental premise of robust biometrics is that a given dataset for each person is unique. Therefore, if the dataset is sufficiently robust, it is impossible to have duplicative input data unless the input data was derived from a machine. Exploiting this premise allows a second level knockout assessment to deny user access if the input data exactly (or statistically sufficiently) matches previously recorded data. Of course, the skilled practitioner employing this method can select (either explicitly or via programming) sample points of a dataset for comparison as opposed to all data, thereby reducing computational overhead and storage issues. Alternatively, if samples are used, an exact match could then invoke a more intensive comparison with the same stored datasets, where again access can be denied when an exact or statistically sufficient match is found.

In the foregoing two assessments, an object has been to ferret out bots in an efficient and low overhead manner by exploiting intrinsic design limitations. However, it is possible that a bot designer could spoof these assessment means by, for example, running many bots in parallel wherein intrinsic delays in CPU processing and bandwidth would introduce inherent time delays associated with the very inputs being assessed. Therefore, more robust assessment means may be employed to ascertain the presence of a bot.

In robust embodiments of the invention, a third layer of testing may be employed that compares recorded pointer movements and key strokes to previously recorded activity for a given input page that was knowingly created by humans. Thus, as input data is collected for a given page, patterns will emerge that are unique to human activity. Subsequently recorded activity that is inconsistent with these patterns would indicate the potential that the user is a bot. Access could then be denied, or further CAPTCHA tests presented. Alternatively, access could be granted since no lock is pick proof and an object of the invention embodiments is to minimize user exposure to CAPTCHA tests.

What is claimed:

1. A method for assessing a confidence level that an operator of a client computing device interacting with a server is a human being rather than an autonomic computer application, the method comprising:
   a) a single user of a client computing device requesting data from a server;
   b) the server presenting data issued by the server to the client computing device;
   c) monitoring at least some data generated by the user at the client computing device in response to the issued data;
   d) comparing the monitored data to model data relating to human interaction with or in response to the issued data; and
   e) generating a value that represents a confidence level that the monitored data is a result of human interaction on the client computing device rather than that of an autonomic user with or in response to the issued data.

2. The method of claim 1 wherein the model data comprises active model data.

3. The method of claim 2 wherein the active model data comprises pointing device vector movements and/or cadence; key stroke combinations and/or cadence; and/or time differentials between a display element and a response.

4. The method of claim 1 wherein the model data comprises passive model data.

5. The method of claim 4 wherein the passive model data comprises browser cookies; destination IP histories; originating IP address; originating IP address traffic data; originating IP address physical location; and/or third party data regarding abusers comprising originating IP addresses and physical locations.

6. The method of claim 1 wherein b) comprises enabling the client computing device to record input and making such recorded input available to a computing device for comparison according to c).

7. The method of claim 6 wherein the computing device is the server.

8. The method of claim 6 wherein the computing device is the client computing device.

9. The method of claim 6 wherein the computing device is neither the server or the client computing device.

10. The method of claim 6 wherein the recorded input comprises active model data and the recorded input is delivered to a computing device that is not the client computing device.

11. The method of claim 1 wherein at least one monitoring program is operatively installed on the client computing device to perform b).

12. The method of claim 1 wherein d) is performed by neither the server nor the client computing device.

13. The method of claim 1 wherein at least some issued data is not data specific to determination of the user status.

14. The method of claim 1 wherein the issued data is in specific response to a request issued by the client computing device.

15. The method of claim 1 further comprising modifying data delivered to the client computing device subsequent to reaching a predetermined value for d) is reached.

16. The method of claim 1 further comprising repeating a)-d) for a single user instance.

17. The method of claim 1 further comprising repeating a)-d) for a single user instance until a predetermined value for d) is reached.

18. The method of claim 1 further comprising repeating a)-c) and comparing the first instance of the value of d) to the second instance of the value of d).

19. A method for assessing a confidence level that an operator of a client computing device interacting with a server is a human being rather than an autonomic computer application, the method comprising:
   a) acquiring interest data from the client computing device prior to delivery of issued data by the server to the client computing device;
   b) comparing the interest data to model data relating to human interaction with a computing device prior to the time in which the interest data is acquired; and
   c) generating a value that represents a confidence level that a human user rather than an autonomic user operated the client computing device prior to the time in which the interest data is acquired.

20. The method of claim 1 wherein the interest data consists of available data.

* * * * *